(No Model.)
H. C. EZELL & B. A. GEORGE.
COTTON CHOPPER AND CULTIVATOR.
No. 545,880. Patented Sept. 10, 1895.
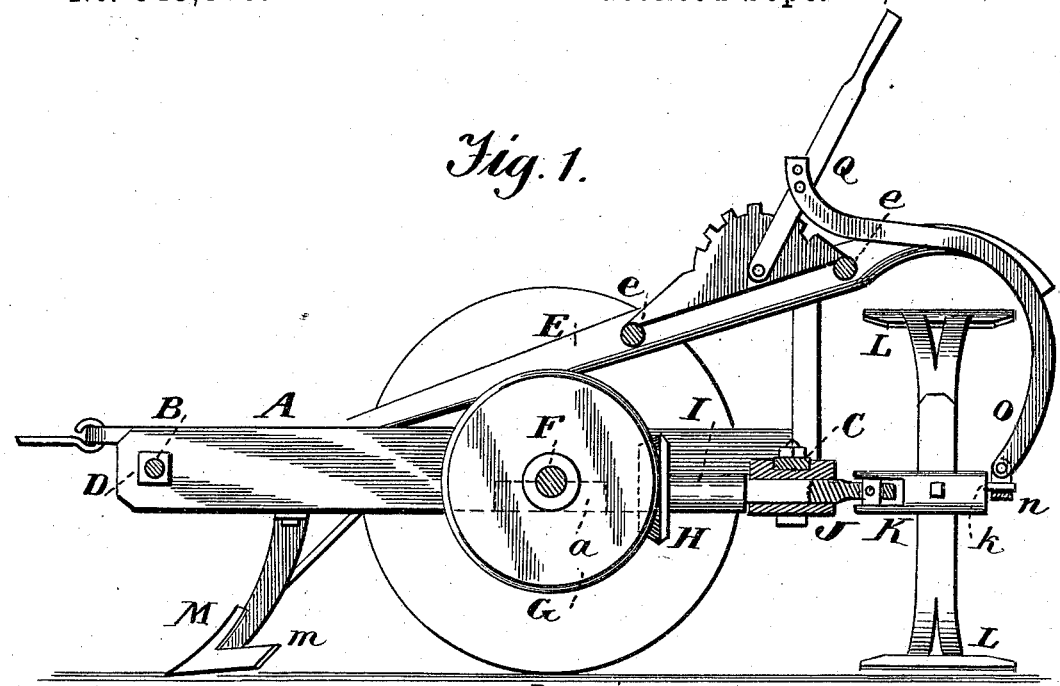
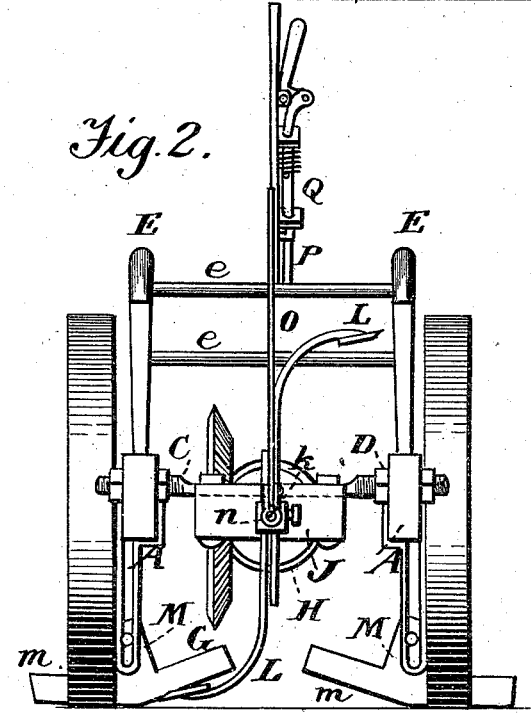
Witnesses.
A. Ruppert.
H. A. Daniels
Inventors.
Henry C. Ezell.
Berry A. George.
Per
Thomas P. Simpson, Atty

UNITED STATES PATENT OFFICE.

HENRY C. EZELL, OF TWILIGHT, AND BERRY A. GEORGE, OF IRON CITY, GEORGIA.

COTTON CHOPPER AND CULTIVATOR.

SPECIFICATION forming part of Letters Patent No. 545,880, dated September 10, 1895.

Application filed March 14, 1894. Serial No. 503,603. (No model.)

*To all whom it may concern:*

Be it known that we, HENRY C. EZELL, residing at Twilight, in the county of Miller, and BERRY A. GEORGE, residing at Iron City, in the county of Decatur, State of Georgia, citizens of the United States, have invented certain new and useful Improvements in Cotton Choppers and Cultivators; and we do declare the following to be a full, clear, and exact description of the invention, such as will enable others skilled in the art to which it appertains to make and use the same, reference being had to the accompanying drawings, and to the letters of reference marked thereon, which form a part of this specification.

The special object of this invention is to make a cotton chopper and cultivator in which the chopper may be conveniently raised or lowered, as hereinafter described.

Figure 1 of the drawing is a longitudinal vertical section, and Fig. 2 a rear elevation.

In the drawings, A A represent two longitudinal parallel bars, connected at the ends by the screw-bars B C and secured thereon between the nuts D D.

E E are the handles connected by the cross-pieces *e e* and fastened at the front ends to the upper faces of the bars A A, under which are the bearings *a a* for the axle F, which carries a bevel-wheel G, that meshes with the bevel-pinion H. The latter is fast on a short shaft I, which revolves in a bearing J, secured to the under side of the cross-rod H. To the outer end of the shaft I is connected by a universal joint the shaft K, which carries the choppers L and revolves across the row so as to chop out the plants at proper intervals.

In front of the plow-frame I arrange the sweeps M M, each of which has a wing *m* on both sides, so as to work one-half the row in which it moves.

The shaft K has in its outer end a bearing *k*, which turns on a pivot *n* in the outer end of the superposed rod O, which may be raised or lowered and securely held by the pawl and ratchet P Q.

Having thus described all that is necessary to a full understanding of our invention, what we claim as new, and desire to protect by Letters Patent, is—

The scraper M obtuse-angled on its bottom-face to allow the face of one arm to run in the furrow while the other scrapes the inclined side of the cotton row, and provided with a median vertical arm or shank adjustable by a pin or clamp screw in a vertical slot of its holder as shown.

In testimony whereof we affix our signatures in presence of two witnesses.

HENRY C. EZELL.
    BERRY A. GEORGE.

Witnesses:
 S. T. MORTON,
 CHARLEY M. DEAN.